—

3,195,975
TRI-METHYLOL PROPANE DIALLYL ETHER TREATMENT OF POLYOLEFIN-POLYMERIC NITROGENOUS COMPOUND MIXTURES AND FIBERS AND PRODUCT THEREOF
Vittorio Cappuccio, Terni, Italy, assignor to Montecatini Società Generale per l'Industria Mineraria e Chimica, Milan, Italy
No Drawing. Filed Aug. 6, 1962, Ser. No. 214,861
Claims priority, application Italy, Aug. 10, 1961, 14,728/61
14 Claims. (Cl. 8—115.5)

The present invention relates to a process for improving the tinctorial characteristics of articles of olefin polymers and, more particularly, of fibers obtained by the spinning of mixtures of crystalline olefin polymers prepared by low pressure polymerization with the aid of stereospecific catalysts and of basic nitrogen polymers. In preceding patent applications various processes have been described for improving the dye-receptivity of fibers obtained by extrusion of mixes of crystalline polyolefins and basic nitrogen polymers. Such processes have comprised subjecting the fibers to the action of diepoxy compounds (such as ethylene glycol diglycidyl ether, 4,4'-dioxydiphenyl-dimethylmethane, and diepoxy butane), ethylene glycol dichlorohydrin, halogens, alkyleneoxides, diisocyanates, formaldehyde, cross-linking monomers such as divinylbenzene, divinylacetylene, etc.

According to the present invention it has surprisingly been found that treatment with trimethylolpropane-diallyl-ether:

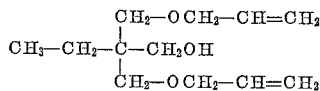

of textile fibers of crystalline polyolefins prepared with the aid of stereospecific catalysts, more particularly polypropylene, modified by the addition of a basic nitrogen polymer acting as tinctorial modifier, improves the tinctorial characteristics of such fibers.

The treatment of the present invention is particularly suitable for yarns of polypropylene and tinctorial modifiers consisting of basic nitrogen compound having a polymeric nature, such as polyimines, polyvinylpyridines prepared with stereospecific catalysts, and basic polymers of epichlorohydrin.

According to the invention, the treatment of the fibers is conveniently carried out by immersing such fibers into aqueous or organic solutions containing trimethylolpropane diallyl ether, at a temperature of from about room temperature to 80° C., for a time of from about a few seconds up to 2 or 3 hours. The solution desirably contains a trimethylpropane diallyl ether concentration, of from about 0.1 to 25%, by weight, and preferably from about 1 to 10%.

The treatment of the fibers can be carried out in the presence of substances having a swelling action on the fibers.

The application of trimethylolpropane diallyl ether according to the present invention is carried out before and/or after stretching of the fibers.

The treatment of the fibers containing polymeric nitrogen compounds as tinctorial modifiers increases the receptivity of the fibers for dyes, e.g., acid, metallized, chromium, vat, or dispersed dyes.

Moreover, the color fastness is substantially increased.

The treatment according to the invention is applied to fibers made from crystalline polyolefins prepared with the aid of stereospecific catalysts, more particularly polypropylene consisting essentially of isotactic macromolecules and basic nitrogen compounds such as, crystalline polyvinylpyridines, basic polymers of epichlorohydrin, organic dihalogen condensates, polyimines and the like.

The spinning of the mixes is conveniently carried out in the presence of a small amount (preferably from about 0.1 to 5% based upon the weight of the total mix) of a "solid dispersant" which facilitates the homogeneous dispersion of the basic nitrogen product in the polymer mass. This solid dispersant may be cetyl or stearyl alcohol, stearic or terephthalic acid, benzoin, furoin, vinyl stearate, mono-, di- or tri-stearic esters of glycerol, monoethanolamine stearate, N-diethyanol lauramide, $C_6$–$C_{30}$ aliphatic amines, condensates of ethylene oxide with alcohols, amines or phenols, polystearamide, polyacrylic acid, polystyrene, styrene copolymers, terpene polymers, etc. The fibers obtained by extrusion of the mixes can be mono- or pluri-filaments and are used for preparing continuous or staple yarns or for preparing bulk yarns or bulk staple fibers.

The spinning of the mixes is preferably carried out by extrusion through spinnerets in which the holes have a length/diameter ratio in excess of 1.

The stretching process is desirably carried out with stretching ratios of from about 1:2 and 1:10, at a temperature of from about 80 to 150° C., in stretching devices which may be heated with hot air, steam or a similar fluid, or on a heated plate.

The following examples will illustrate the present invention. The polypropylene used in the examples shows crystallinity due to the presence of the isotactic structure as defined by Natta et al.

*Example 1*

A mix is prepared at room temperature in a Henschel mixer. The mix consists of

| | Kg. |
|---|---|
| Polypropylene | 9.500 |
| Poly-2-vinylpyridine | 0.500 |

The polypropylene used presents the following characteristics:

| | |
|---|---|
| Intrinsic viscosity [η] as determined in tetrahydronaphthalene at 135° C. | 1.46 |
| Ash content _____percent__ | 0.04 |
| Residue after boiling heptane extraction ___do____ | 95.2 |

The poly-2-vinylpyridine presents the following characteristics:

| | |
|---|---|
| Intrinsic viscosity [η] | 0.35 |
| Melting point _____° C.__ | 189 |

The mix is granulated and then extruded in a melt spinning device under the following conditions:

| | |
|---|---|
| Screw temperature _____° C.__ | 195 |
| Spinning head temperature ____° C.__ | 205 |
| Spinneret head temperature ____° C.__ | 205 |
| Spinneret with 60 holes having a diameter of 0.8 mm. and a length of 16 mm. | |
| Maximum pressure _____kg./cm.² __ | 55 |
| Winding speed _____meter/minute__ | 380 |

The fiber is stretched in a steam-heated device, at a temperature of 130° C., with a stretching ratio of 1:5.3. It is then subjected to a stabilization treatment under conditions of free shrinking, at 150° C., for 60 minutes. The characteristics of the stretched and stabilized fiber are as follows:

| | |
|---|---|
| Tenacity _____g./den__ | 4.3 |
| Elongation _____percent__ | 25 |

The fiber is then crimped and cut into a staple having a length of 9 centimeters.

The staple thus obtained, is immersed for 30 minutes at 25° C. into a 3% aqueous dispersion of trimethylolpropanediallyl ether, containing 0.25% of an ethyleneoxide-octyl phenol (surface active agent) condensate, with a fiber/bath ratio of 1:40. The bath is then heated to 120° C. and the staple is then washed with water and dried.

In this and in the following examples, the treated staple was subjected to dyeing with the following dyes:

Alizarine Yellow 2 G. (C.I. Mordant Yellow 1) (C.I. 14025) (acid dye)
Alizarine Red S. (C.I. Mordant Red 3) (C.I. 58005) (acid dye)
Alizarine Blue SE (C.I. Acid Blue 43) (C.I. 63,000) (acid dye)
Acid black JVS (C.I. Acid Black 1) (C.I. 20470) (acid dye)
Setacyl Brilliant Blue B.G. 61505 (C.I. Disperse Blue 3) (disperse dye)

The dyeing was carried out for one and one-half hours at the boiling point in baths containing 2.5% of dye calculated on the weight of the fiber, with a fiber/bath ratio of 1:40.

The dyeing with acid or metallized dyes was carried out in the presence of 3% of ammonium acetate (by weight of the fiber) and 1% of a surface active agent consisting of the condensation product of ethylene oxide with octyl phenol.

Thirty minutes after the beginning of boiling, 0.2% of glacial acetic acid (by weight of the fiber) was added in order to improve the bath exhaustion.

The dyeing with disperse dye was carried out in the presence of 2% (by weight of the fiber) of a surface-active condensation product of ethylene oxide with an alcohol.

The fibers after dyeing were rinsed with running water and appeared to be intensely dyed, either with acid or metallized or disperse dyes. The fastness of the color to light, washing and rubbing was completely satisfactory.

*Example 2*

A mix is prepared at room temperature in a Henschel mixer, consisting of:

| | Kg. |
|---|---|
| Polypropylene | 9.500 |
| Octadecylamine - epichlorohydrin/piperazine polymer | 0.500 |

The characteristics of the polypropylene used are as follows:

| | |
|---|---|
| $[\eta]$ | 1.46 |
| Ash content | 0.04 |
| Residue after boiling heptane extraction __percent__ | 95.2 |

The mix is granulated and then extruded in a melt-spinning device under the following conditions:

| | |
|---|---|
| Screw temperature _____° C__ | 195 |
| Spinning head temperature _____° C__ | 200 |
| Spinneret head temperature _____° C__ | 205 |
| Spinneret type: 60/0.8 x 16 mm. (60 holes with a diameter of 0.8 mm. and a length of 16 mm.). | |
| Maximum pressure _____kg./cm.$^2$__ | 55 |
| Winding speed _____meters/minute__ | 380 |

The fiber is stretched in a steam-heated device at a temperature of 130° C. with a stretching ratio of 1:5.3.

It is then subjected to a dimensional stabilization treatment, under conditions of free shrinking, at 105° C. for 60 minutes.

The characteristics of the stretched and thermo-stabilized fiber are as follows:

| | |
|---|---|
| Tenacity _____g./den__ | 4.7 |
| Elongation _____percent__ | 23.8 |

The fiber is then crimped and cut into a staple having a length of 9 cm.

The staple thus obtained is immersed for 30 minutes at 25° C. into a 5% aqueous dispersion of trimethylolpropane diallylether, containing 0.25% of ethylene oxide-octylphenol condensate (surface-active agent), with a fiber/bath ratio of 1:40. The bath is then heated to 120° C. for 20 minutes and the staple is then washed with water and dried.

Using the same dyes and method as described in Example 1, intense solid colors are obtained.

*Example 3*

A mix is prepared at room temperature in a Henschel mixer, consisting of:

| | Kg. |
|---|---|
| Polypropylene | 9.500 |
| Dichloroethane / hexamethylenediamine polymer alkylated with lauryl chloride | 0.500 |

The characteristics of polypropylene are as follows:

| | |
|---|---|
| $[\eta]$ | 1.46 |
| Ash content _____percent__ | 0.04 |
| Residue after boiling heptane extraction __do__ | 95.2 |

The mix is granulated and then extruded under the following conditions:

| | |
|---|---|
| Screw temperature _____° C__ | 195 |
| Spinning head temperature _____° C__ | 205 |
| Spinneret temperature _____° C__ | 205 |
| Spinneret type: 60/0.8 x 16 mm. | |
| Maximum pressure _____kg./cm.$^2$__ | 57 |
| Winding speed _____meters/minute__ | 380 |

The fiber is stretched in a steam-heated device at 130° C. with a stretching ratio of 1:5.3.

It is then subjected to a dimensional stabilization treatment, under conditions of free shrinking, at 105° C. for 60 minutes.

The characteristics of the stretched and thermo-stabilized fiber are as follows:

| | |
|---|---|
| Tenacity _____g./den__ | 4.5 |
| Elongation _____percent__ | 25 |

The fiber is then crimped and cut into a staple with a length of 9 cm. The staple fiber thus obtained is immersed for 30 minutes at 25° C. into a 5% aqueous dispersion of trimethylolpropane diallyl ether, containing 0.25% of an ethyleneoxide/octylphenol condensate (surface active agent), with a fiber/bath ratio of 1:40. The bath is then heated to 120° C. for 20 minutes and the fiber is then washed with water and dried. Using the dyes and procedure as described in Example 1, intense solid colors are obtained.

Variations can, of course, be made without departing from the spirit of the invention.

Having thus described the invention, what is desired to be secured and hereby claimed by Letters Patent is:

1. A process for improving the dyeability of fibers prepared by molten mass extrusion followed by stretching, said process comprising treating said fibers, which are made from a mixture of a crystalline polyolefin consisting essentially of isotactic macromolecules and from about 1 to 25% by weight, based on said polyolefin, of a basic nitrogen compound having a resinous character and being selected from the group consisting of crystalline vinyl pyridine polymers, polyalkylene polyimines, and condensation products of a primary aliphatic amine with epichlorohydrin and piperazine, with trimethylolpropane diallyl ether to thereby increase the dyeability of said fibers and the fastness of the colors thereto.

2. The process of claim 1, wherein said crystalline polyolefin is polypropylene consisting essentially of isotactic macromolecules.

3. The process of claim 2, wherein the basic nitrogen compound is a crystalline vinylpyridine polymer.

4. The process of claim 3, wherein the vinylpyridine polymer is poly-2-vinylpyridine.

5. The process of claim 2, wherein the basic nitrogen compound is a condensation product of a primary aliphatic amine with epichlorohydrin and piperazine.

6. The process of claim 2, wherein the basic nitrogen compound is a polyimine obtained by condensation of dihalogen alkane with a diamine.

7. The process of claim 6, wherein the treatment is carried out at a temperature of from about room temperature to 150° C., wherein, based on said trimethylolpropane diallyl ether, there is a halogen concentration of from about 0.1 to 25% by weight, and wherein the treatment time is from about a few seconds to 3 hours.

8. The method of claim 7, wherein said temperature is from about room temperature to 80° C. and wherein said halogen concentration is from about 1 to 10%

9. The process of claim 2, wherein in the preparation of said mixture there is added from about 0.1 to 5%, based on the weight of said mixture, of a solid dispersant for said basic nitrogen compound, said dispersant being selected from the group consisting of cetyl and stearyl alcohol, stearic and terephthalic acid, benzoin, furoin, vinyl stearate, mono-, di- and tri-stearic esters of glycerol, monoethanolamine stearate, N-diethanol lauramide, $C_6$–$C_{30}$ aliphatic amines, condensates of ethylene oxide with alcohols, amines and phenols, polystearamide, polyacrylic acid, polystyrene, styrene copolymers, terpene polymers.

10. The process of claim 2, wherein the spinning is carried out by extrusion through spinnerets in which the holes have a length/diameter ratio in excess of 1.

11. The process of claim 2 in which the extruded fibers are stretched with a stretching ratio of from about 1:2 to 1:10 at a temperature of from about 80° C. to 150° C., and heated stretching devices.

12. A new composition exhibiting improved dyeability characteristics, said composition comprising a crystalline polyolefin showing the isotactic structure, from about 1 to 25% by weight, based on said polyolefin, of a basic nitrogen compound having a resinous character and being selected from the group consisting of crystalline vinyl pyridine polymers, polyalkylene polyimines, and condensation products of a primary aliphatic amine with epichlorohydrin and piperazine, and trimethylolpropane diallyl ether.

13. The process of claim 3, wherein the vinylpyridine polymer is poly-4-vinlypyridine.

14. The process of claim 3, wherein the vinylpyridine polymer is poly-2-methyl-5-vinylpyridine.

References Cited by the Examiner

UNITED STATES PATENTS

| | | |
|---|---|---|
| 2,643,958 | 6/53 | Kleiner. |
| 2,789,030 | 4/57 | Fetscher _____ 8—120 |
| 2,933,366 | 4/60 | Coe _____ 8—120 X |
| 3,013,998 | 12/61 | Battaglioli. |
| 3,049,508 | 8/62 | Stanton et al. |

FOREIGN PATENTS

| | | |
|---|---|---|
| 821,977 | 10/59 | Great Britain. |
| 1,065,401 | 9/59 | Germany. |

NORMAN G. TORCHIN, *Primary Examiner.*